(12) United States Patent
Teng et al.

(10) Patent No.: US 11,815,776 B2
(45) Date of Patent: Nov. 14, 2023

(54) ARRAY SUBSTRATE, DISPLAY PANEL AND DISPLAY DEVICE

(71) Applicant: Xiamen Tianma Micro-Electronics Co., Ltd., Xiamen (CN)

(72) Inventors: Yongjin Teng, Xiamen (CN); Xiaoli Liu, Xiamen (CN); Yingzhang Qiu, Xiamen (CN); Limin Lin, Xiamen (CN); Jiao Gao, Xiamen (CN); Tingxi Huang, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/610,415

(22) PCT Filed: Jun. 28, 2020

(86) PCT No.: PCT/CN2020/098612
§ 371 (c)(1),
(2) Date: Nov. 10, 2021

(87) PCT Pub. No.: WO2021/237863
PCT Pub. Date: Dec. 2, 2021

(65) Prior Publication Data
US 2023/0071313 A1    Mar. 9, 2023

(30) Foreign Application Priority Data

May 29, 2020   (CN) .......................... 202010478724.2

(51) Int. Cl.
*G02F 1/1368*   (2006.01)
*G02F 1/1362*   (2006.01)
(Continued)

(52) U.S. Cl.
CPC ...... *G02F 1/1368* (2013.01); *G02F 1/133512* (2013.01); *G02F 1/134309* (2013.01);
(Continued)

(58) Field of Classification Search
CPC ............ G02F 1/1333; G02F 1/133345; G02F 1/1335; G02F 1/133512; G02F 1/133514;
(Continued)

(56) References Cited

U.S. PATENT DOCUMENTS 5,314,771 A    5/1994  Yamauchi et al.
7,911,567 B2   3/2011  Roh et al.
(Continued)

FOREIGN PATENT DOCUMENTS

CN    104216180 A    12/2014
CN    105652357 A    6/2016
(Continued)

*Primary Examiner* — Thoi V Duong
(74) *Attorney, Agent, or Firm* — CHRISTENSEN O'CONNOR JOHNSON KINDNESS PLLC

(57) ABSTRACT

Provided are an array substrate, a display panel and a display device. The array substrate includes a first base; a switch array layer including transistors; a pixel electrode layer including pixel electrodes, each of which being connected to a drain electrode of a pixel electrode through a via; and a color resist array layer including color resists, each of which includes a first edge and a second edge opposite to each other in a first direction. First and second recesses are formed at first and second edges; for two color resists adjacent in the first direction, the first recess of one color resist is opposite to the second recess of the other color resist; and projections of the first and second recesses overlap at least partially with a projection of the via in a second direction, and the second direction is parallel to a thickness direction of the array substrate.

14 Claims, 11 Drawing Sheets

(51) Int. Cl.
*G02F 1/1343* (2006.01)
*G02F 1/1335* (2006.01)

(52) U.S. Cl.
CPC .. *G02F 1/136222* (2021.01); *G02F 1/136227* (2013.01); *G02F 2201/121* (2013.01)

(58) Field of Classification Search
CPC ............ G02F 1/133516; G02F 1/1343; G02F 1/134309; G02F 1/134318; G02F 1/134363; G02F 1/1362; G02F 1/136222; G02F 1/136227; G02F 1/1368; G02F 2201/121; H01L 27/1222
See application file for complete search history.

(56) References Cited

U.S. PATENT DOCUMENTS

2009/0263921 A1  10/2009  Lee et al.
2010/0157211 A1*  6/2010  Kim .................. G02F 1/133516
                                                                    445/24
2016/0148950 A1*  5/2016  Xu .................... H01L 29/78633
                                                                    438/158
2016/0154273 A1*  6/2016  Itou ....................... G02B 5/201
                                                                    359/891
2018/0143500 A1*  5/2018  Yu .................... G02F 1/134309

FOREIGN PATENT DOCUMENTS

| | | |
|---|---|---|
| CN | 105974651 A | 9/2016 |
| CN | 205809499 U | 12/2016 |
| CN | 106547139 A | 3/2017 |
| CN | 107229152 A | 10/2017 |
| CN | 207817366 U | 9/2018 |
| CN | 108873449 A | 11/2018 |
| CN | 108873450 A | 11/2018 |
| CN | 109557733 A | 4/2019 |
| CN | 109634014 A | 4/2019 |
| CN | 111090200 A | 5/2020 |

* cited by examiner

ARRAY SUBSTRATE, DISPLAY PANEL AND DISPLAY DEVICE

TECHNICAL FIELD

The present disclosure relates to the field of display technology, and in particular, to an array substrate, a display panel and a display device.

BACKGROUND

Liquid crystal display is still mainstream display technology in the field of display technology due to its mature process and low cost. With a pursuit of large display screens, a portable flexible display screen and a foldable display screen become desired features. However, there are still various difficulties in designing the currently most mature liquid crystal display into a flexible display screen or a foldable display screen.

Liquid crystal display operates by injecting liquid crystal molecules between two opposite substrates to form a liquid crystal cell. A rotation state of the liquid crystal molecules can control whether backlight located at one side of the liquid crystal cell can pass through the liquid crystal cell to reach a light-exiting surface. However, since the backlight is white, color resists are required on a substrate to convert white light into light of other colors. However, in the related art, color resists are generally provided on one substrate, for example, on a color filter substrate; and metal wiring for signal transmission is provided on another substrate. As a result, when the liquid crystal display screen is bent to form a flexible display screen or a foldable display screen, for some pixels, a deviation between the color resist corresponding to a pixel and the metal wiring corresponding to the pixel may occur, thereby affecting normal display.

SUMMARY

In view of the above, an array substrate, a display panel and a display device are provided, so as to solve the above problems.

In a first aspect, an embodiment of the present disclosure provides an array substrate, including a first base; a switch array layer arranged on the first base and including a plurality of transistors; a pixel electrode layer including a plurality of pixel electrodes, each of which being electrically connected to a drain electrode of a respective one of the plurality of pixel electrodes through a respective via; and a color resist array layer including a plurality of color resists, each of which includes a first edge and a second edge that are opposite to each other in a first direction. At least one first recess is formed at the first edge, and at least one second recess is formed at the second edge; of two color resists of the plurality of color resists that are arranged adjacently in the first direction, the at least one first recess of one color resist is opposite to the at least one second recess of the other color resist; and projections of the at least one first recess and the at least one second recess that are opposite to each other overlap at least partially with a projection of the via in a second direction, and the second direction is parallel to a thickness direction of the array substrate.

In a second aspect, an embodiment of the present disclosure further provides a display panel, including: the array substrate according to the first aspect; an opposing substrate opposite to the array substrate; and a liquid crystal layer located between the opposing substrate and the array substrate.

In a third aspect, an embodiment of the present disclosure further provides a display device, including the display panel according to the second aspect.

In the array substrate, the display panel and the display device according to the embodiments of the present disclosure, the color layer is formed on the array substrate, which can avoid problems of light leakage and color display chaos caused by deviation between the color resist and the corresponding subpixels in the process of bending the corresponding display panel. In addition, the design of the color resist according to the present disclosure can be applied to the design of high pixel density and can achieve an expected manufacturing yield of the color resists. Through the design of the color resist according to the embodiments of the present disclosure, a distance between light-shielding regions of a mask plate is increased during a process for forming the color resist, thereby avoiding diffraction of light in 30 an exposure process, so as to obtain a designed shape of the color resist. At the same time, through the design of the color resist according to the embodiments of the present disclosure, during development, a photoresist to be removed is located at an edge of a cured photoresist, so as to fully contact a developing solution to be completely developed off; during etching, the color resist to be etched off is located at an edge of the color resist, so as to fully contact an etching solution to be completely etched off. Therefore, the design of the color resist according to the embodiments of the present disclosure can reduce difficulty in terms of forming a hole in the color resist, thereby improving the reliability of the connection between the pixel electrode and the transistor.

BRIEF DESCRIPTION OF DRAWINGS

In order to better illustrate technical solutions in embodiments of the present disclosure, the accompanying drawings used in the embodiments are briefly introduced as follows. It should be noted that the drawings described as follows are merely part of the embodiments of the present disclosure, and other drawings can also be acquired by those skilled in the art.

DESCRIPTION OF EMBODIMENTS

To better illustrate technical solutions of the present disclosure, embodiments of the present disclosure will be described in detail as follows with reference to the accompanying drawings.

It should be noted that described embodiments are merely exemplary embodiments of the present disclosure, which shall not be interpreted as providing limitations to the present disclosure. All other embodiments obtained by those skilled in the art according to the embodiments of the present disclosure fall within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that, although the color may be described using the terms of "first", "second", "third", etc., in the embodiments of the present disclosure, the color will not be limited to these terms. These terms are merely used to distinguish colors from one another. For example, without departing from the scope of the embodiments of the present disclosure, a first-color color resist may also be referred to as a second-color color resist, similarly, a second-color resist may also be referred to as a first-color resist.

The applicant of the present disclosure, through careful and in-depth research, has provided a technical solution to the problems existing in the related art.

Figure 1:
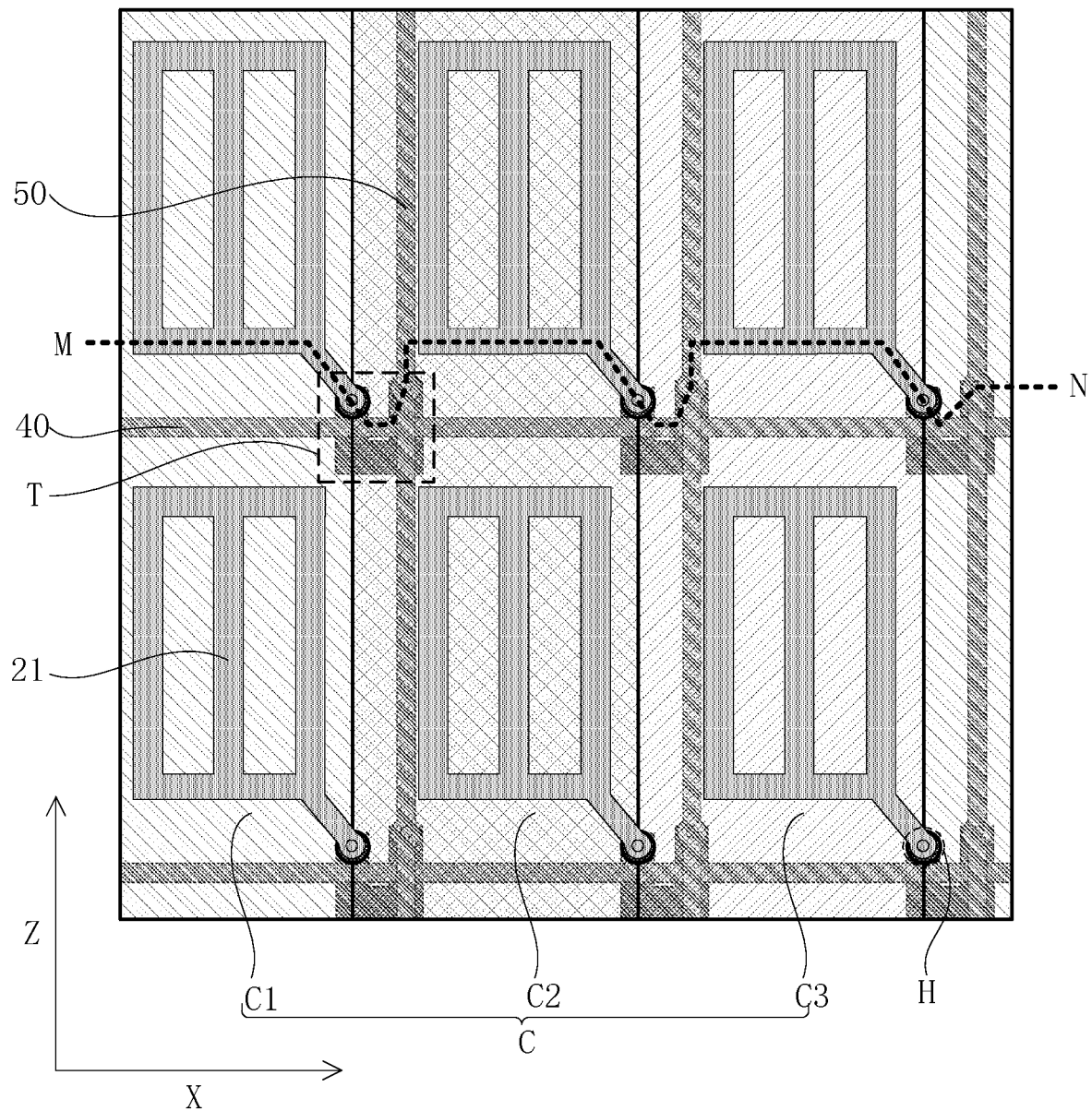
FIG. 1 is a schematic diagram of an array substrate according to an embodiment of the present disclosure.
Figure 2:
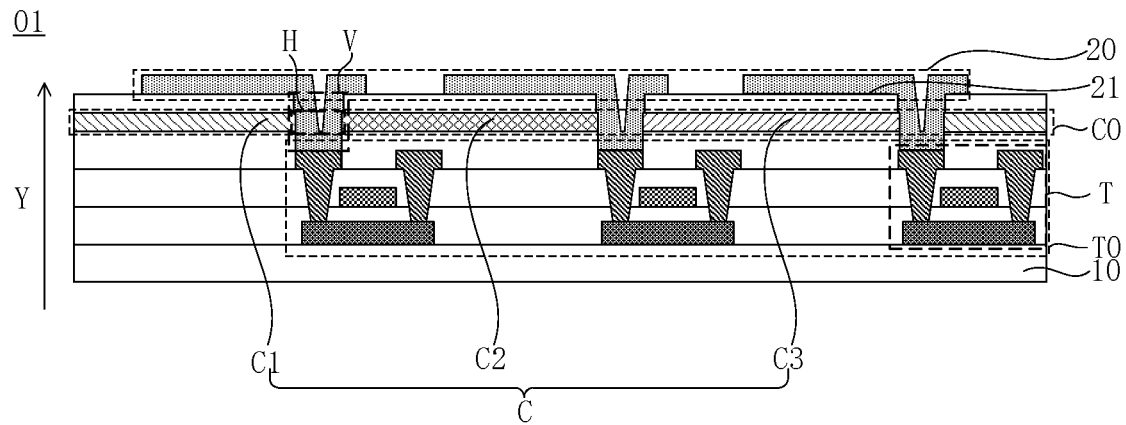
FIG. 2 is a cross-sectional view along MN shown in FIG. 1.
Figure 3:
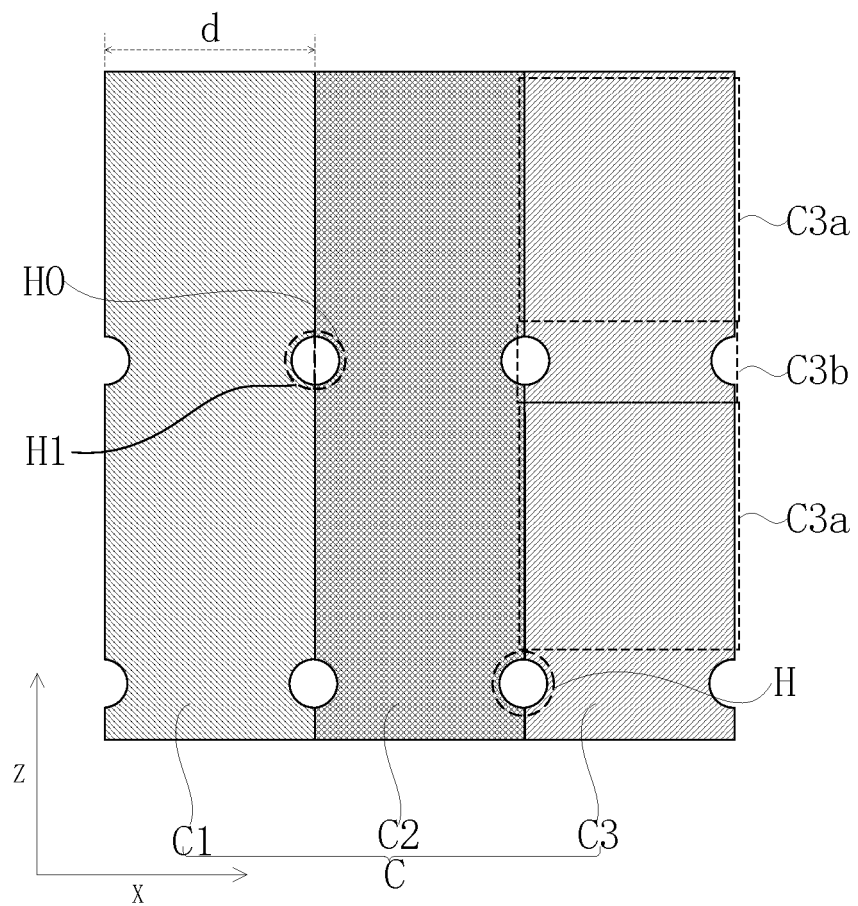
FIG. 3 is a schematic diagram of a color resist array layer according to an embodiment of the present disclosure.

FIG. 1 is a schematic diagram of an array substrate according to an embodiment of the present disclosure, FIG. 2 is a cross-sectional view along MN shown in FIG. 1, and FIG. 3 is a schematic diagram of a color resist array layer according to an embodiment of the present disclosure.

Referring to FIG. 1 and FIG. 2, the array substrate 01 according to an embodiment of the present disclosure includes a first base 10, a switch array layer T0, a pixel electrode layer 20 and a color resist array layer C0.

The switch array layer T0 is arranged on the first base 10, and the switch array layer T0 includes a plurality of transistors T. A gate electrode of the transistor T is electrically connected to a gate line 40, and the gate line 40 receives a gate scanning signal to control the transistor T to be turned on. A source electrode of the transistor T is connected to a data line 50, and the data line 50 provides a display signal for display.

The pixel electrode layer 20 includes a plurality of pixel electrodes 21. The pixel electrode 21 is electrically connected to a drain electrode of the transistor T through a via V. The pixel electrode 21 may receive the display signal through the transistor T. For example, the gate line 40 receives a gate scanning signal to control the transistor T to be turned on, the data line 50 transmits a display signal, and the display signal is transmitted to the drain electrode through the source electrode of the transistor T and then is transmitted to the pixel electrode 21.

The color resist array layer C0 includes a plurality of color resists C which includes a first-color color resist C1, a second-color color resist C2 and a third-color color resist C3. White light passing through the first-color color resist C1 may be turned into first-color light, white light passing through the second-color color resist C2 may be turned into second-color light, and white light passing through the third-color color resist C3 may be turned into third-color light.

As shown in FIG. 3, the color resist C includes a first edge and a second edge that are opposite to each other in a first direction X, the first edge includes a first recess H0, and the second edge includes a second recess H1. For two color resists C arranged adjacently in the first direction, the first recess H0 of one color resist C is opposite to the second recess H1 of the other color resist C. It is to be noted that FIG. 1 shows a structure of a portion of the array substrate, and correspondingly, FIG. 3 shows only a color resist layer corresponding to this portion of the array substrate. It is to be further noted that the first edge and the second edge of the color resist C in this embodiment of the present disclosure refer to two opposite edges of the color resist C. As shown in FIG. 3, for each color resist C, a left edge of the color resist C may be considered as the first edge and a right edge of the color resist C may be considered as the second edge. It is also possible that, for each color resist C, the left edge of the color resist C may also be considered as the second edge and the right edge of the color resist C may also be considered as the first edge.

Taking the color resist layer C0 shown in FIG. 3 as an example, the left edge of the second-color color resist C2 is the first edge of the second-color color resist C2, and the first edge includes the first recess H0; and the right edge of the first-color color resist C1 is the second edge, and the second edge includes the second recess H1. The second-color color resist C2 and the first-color color resist C1 are arranged adjacently in the first direction X, and the first edge of the second-color color resist C2 and the second edge of the first-color color resist C1 are arranged adjacently in the first direction X. In this way, one first recess H0 of the second-color color resist C2 is opposite to one second recess H1 of the first-color color resist C1. One first recess H0 and one second recess H1 that are opposite to each other may be regarded as a via portion H.

Referring to FIG. 1 to FIG. 3, the pixel electrode 21 is electrically connected to a drain electrode of the transistor T through a via V. Since the color resist layer C0 is located between the pixel electrode layer 20 and the switch array layer T0, a portion of the color resist layer C0 corresponding to the via V should be a hollow-out portion. In this embodiment of the present disclosure, the hollow-out portion of the color resist layer C0 corresponding to the via V is the via portion H, which is constituted by the first recess H0 and the second recess H1 that are opposite to each other.

Referring to FIG. 2, a projection of the via portion H in a second direction Y overlaps with a projection of the via V in the second direction Y. That is, projections of the first recess H0 and the second recess H1 that are opposite to each other overlap at least partially with the projection of the via V in the second direction Y. The second direction Y is parallel to a thickness direction of the array substrate.

In the array substrate according to this embodiment of the present disclosure, the via portion H in the color resist layer C0 corresponding to the via V is formed by the first recess H0 and the second recess H1 arranged oppositely. The first recess H0 and the second recess H1 constituting the via portion H belong to two color resists C arranged adjacently respectively. Beneficial effects of this embodiment of the present disclosure are described below with reference to FIG. 4 and FIG. 5.

Figure 4:
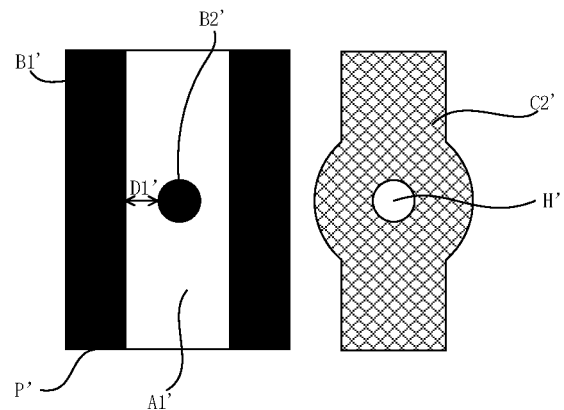
FIG. 4 shows a method for forming a color resist.
Figure 5:
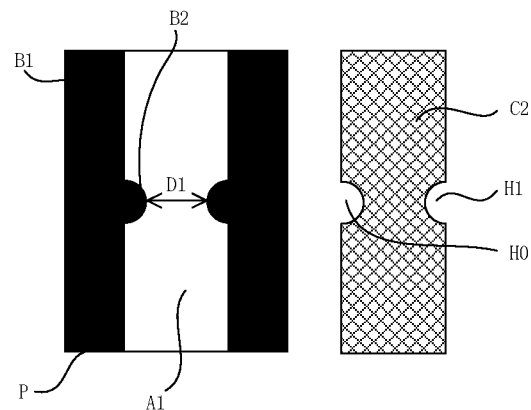
FIG. 5 shows a method for forming a color resist according to an embodiment of the present disclosure.

FIG. 4 is a method for forming a color resist, and FIG. 5 shows a method for forming a color resist according to an embodiment of the present disclosure.

The following description is based on an example in which the second-color color resist C2 is formed. It may be understood that the first-color color resist C1 and the third-color color resist C3 are both applicable to the following description. Since consumers and developers demand high pixel density display, each subpixel is formed into a smaller and a smaller size, especially in terms of the width. In this embodiment of the present disclosure, since the color resist layer C0 is formed below the pixel electrode on the array substrate, the pixel electrode 21 needs to pass through the color resist layer C0 when being electrically connected to the transistor T. Therefore, the color resist C should be provided with a hollow-out portion allowing the pixel electrode 21 to be connected to the transistor T.

The inventor finds that, if the width of the subpixel is small, when the color resist is exposed, developed and etched using the mask plate P' shown in FIG. 4, an abnormal-shaped color resist may be obtained. For example, a second-color color resist C2' is formed using the mask plate P' shown in FIG. 4 and a negative photoresist. A first region B1' and a second region B2' of the mask plate P' represent light-shielding portions, and a third region A1' represents a light-transmitting portion. In a case that a hollow-out portion H' of the second-color color resist C2' allowing the pixel electrode 21 to be connected to the transistor T has a continuous structure, the second region B2' of the mask plate P' corresponding to the hollow-out portion H' should also have a continuous structure. In this case, a first distance D1' between the second region B2' and the first region B1' spaced apart from and adjacent to the second region B2' may be too small. In a process of exposing a photosensitive resist above the second-color color resist C2', since the first distance D1' is too small, light diffraction makes a part of the photosensitive resist corresponding to the first region B1' exposed and cured. After development, this part of the photoresist cannot be removed, so the color resist below this part of the photoresist cannot be removed after etching. As a result, the abnormal-shaped second-color color resist C2' as shown in FIG. 4 is formed.

Through the design of the color resist C according to this embodiment, the structure of the mask plate P used is shown in FIG. 5. Since the hollow-out portion allowing the pixel electrode 21 to be electrically connected to the transistor T, that is, the via portion H according to this embodiment of the present disclosure, is constituted by the first recess H0 of one of two adjacent color resists C and the second recess H1 of the other color resist of the two adjacent color resists C, and the first recess H0 and the second recess H1 of each color resist C are formed at two opposite edges of the color resist, correspondingly, a first region B1 and a second region B2 of the mask plate P represent light-shielding portions and a third region A1 represents a light-transmitting portion, and the left and right protruding second regions B2 respectively correspond to the first recess H0 and the second recess H1.

If a width of the hollow-out portion H' shown in FIG. 4 is equal to a sum of a width of the first recess H0 and a width of the second recess H1, a second distance D1 between two second regions B2 of the mask plate P that are opposite to each other shown in FIG. 5 is twice the first distance D1' shown in FIG. 4, and a distance between the second region B2 and the first region B1 that is spaced apart from the second region B2 shown in FIG. 5 is greater than the second distance D1. That is, through the design of the color resist C according to this embodiment of the present disclosure, a distance between light-shielding regions of the mask plate P corresponding thereto is increased, thereby avoiding light diffraction in an exposure process, so as to obtain a designed shape of the color resist C.

In addition, referring to FIG. 4, if the hollow-out portion H' formed in the second-color color resist C2' is a closed hole, the closed hole is surrounded by remaining portions of the second-color color resist C2' after etching. In this case, the photosensitive resist above the hollow-out portion H' should be removed during the development, while the photosensitive resist surrounding it should remain. That is, during the development, an uncured photoresist in an intermediate region surrounded by a cured photoresist is removed through the developing solution, which may lead to incomplete removal of the uncured photoresist in the intermediate region and then lead to no removal of the second-color color resist C2' below the photoresist that is uncured and not removed by development. In addition, since the hollow-out portion H' is located in the middle of the second-color color resist C2', such a portion may be unable to fully receive the etching solution in the process of etching the hollow-out portion H' by using the etching solution, resulting in incomplete etching, which is particularly evident when an aperture of the hollow-out portion H' is too deep. Either of the above two situations leads to difficulty in terms of forming a hole in the color resist and may cause residual color resist in the hollow-out portion H', thereby affecting the reliability of the connection between the pixel electrode 21 and the transistor T.

In a process for forming the color resist C according to this embodiment of the present disclosure, the color resists C of different colors are formed one by one, and the first recess H0 and the second recess H1 of each color resist C are formed at the edges of the color resist. That is, in a process for forming a color resist of one color, each of the first recess H0 and the second recess H1 of the color resist is an open structure. As shown in FIG. 5, in a process for forming the second-color color resist C2, the time for forming the color resist C that is located at a left side of the second-color color resist C2 and the time for forming the color resist C that is located at a right side of the second-color color resist C2 are different from the time for forming the second color resist C2, and the left side of the first recess H0 of the second-color color resist C2 and the right side of the second recess H1 of the second-color color resist C2 are not closed. During the development, the photoresist that is above regions corresponding to the first recess H0 and the second recess H1 needs to be removed. Since this photoresist is located at an edge of the cured photoresist, it can fully contact the developing solution to be completely developed off. During the etching, since the portion of the color resist required to be etched off is located at an edge of the color resist, it can fully contact the etching solution to be completely etched off. Therefore, this embodiment of the present disclosure reduces difficulty of forming a hole in the color resist, thereby improving reliability of the connection between the pixel electrode 21 and the transistor T.

In an embodiment of the present disclosure, the first base 10 may be a curved base or a flexible base.

In the related art, the color resist layer C0 is arranged on a color filter substrate opposite to the array substrate 01. During a process of bending a display panel including the array substrate 01 and the color filter substrate, the pixel electrode on the array substrate 01 may be misaligned with the corresponding color resist on the color filter substrate since the array substrate 01 is not integrated with the color filter substrate. As a result, part of the pixel electrode after bending may correspond to part of a color resist adjacent thereto. For example, since a blue color resist may exist above the pixel electrode corresponding to a red pixel, when the red color resist is to emit light, light in a region corresponding to the pixel electrode corresponding to the red color resist may pass through the blue color resist, causing at least part of a region at a corresponding position of the red pixel to emit blue light, which leads to blue light leakage and color display chaos. In this embodiment of the present disclosure, the color resist layer C0 is formed on the array substrate 01. Compared with forming the color resist layer C0 on the color filter substrate opposite to the array substrate 01, the pixel electrode and the corresponding color resist are rarely misaligned during bending, thereby avoiding the problems of light leakage and color display chaos during the process of bending the display panel. In addition, the design of the color resist C according to this embodiment of the present disclosure is applicable to the design of high pixel density and can achieve an expected manufacturing yield of the color resists.

As shown in FIG. 2, in this embodiment of the present disclosure, the color resist layer C0 is arranged at a side of the pixel electrode 20 close to the switch array layer T0. That is, the pixel electrode 21 is located at a side of the color resist C away from the switch array layer T0. Therefore, in this embodiment of the present disclosure, although the color resist layer C0 is arranged on the array substrate, a distance between the pixel electrode 21 and an upper surface of the array substrate may not change. That is, a distance between the pixel electrode and a liquid crystal layer above the upper surface of the array substrate does not change, thereby achieving an expected intensity of the electric field at the location of the liquid crystal layer and thus enabling liquid crystal molecules to rotate normally.

Figure 6:
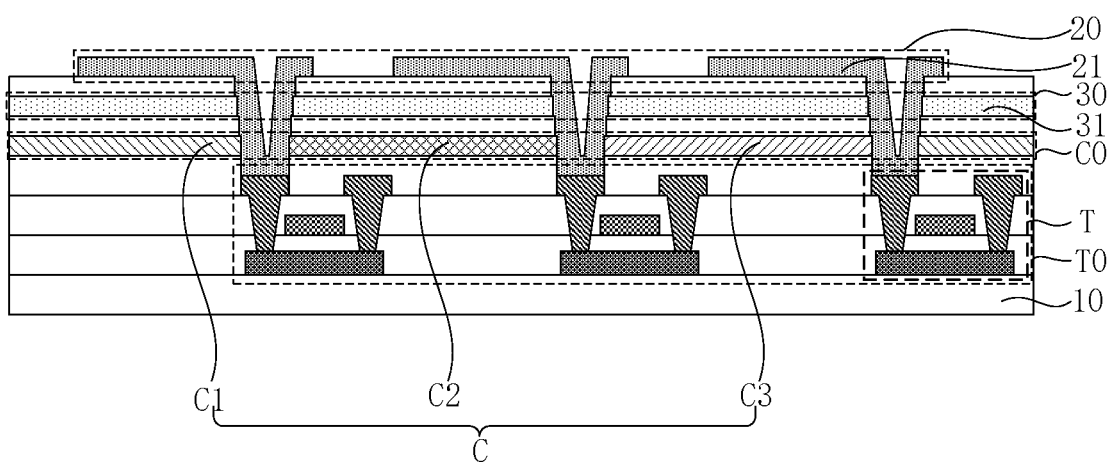
FIG. 6 is another cross-sectional view along MN shown in FIG. 1.

FIG. 6 is another cross-sectional view along MN shown in FIG. 1. As shown in FIG. 6, in an alternative solution of this embodiment of the present disclosure, the array substrate may further include a common electrode layer 30. The common electrode layer 30 includes a common electrode 31. That is, in one embodiment of the present disclosure, the common electrode 31, which is configured to form an electric field between the pixel electrode 21 and the common electrode 31, may also be arranged on the first base 10 together with the pixel electrode 21 to serve as a part of the array substrate 01. The array substrate 01 according to this embodiment of the present disclosure may also be as shown in FIG. 2; that is, the array substrate 01 is not provided with the common electrode 31.

Still referring to FIG. 6, when the array substrate further includes the common electrode layer 30, the common electrode layer 30 is located at a side of the color resist array layer C0 away from the switch array layer T0. Since rotation of the liquid crystal layer is controlled by the electric field formed between the pixel electrode 21 and the common electrode 31, the common electrode layer 30 being positioned closer to the upper surface of the array substrate 01 than the color resist array layer C0 can achieve an expected intensity of the electric field at the location of the liquid crystal layer and can enable the liquid crystal molecules to rotate normally.

The transistor T described in this embodiment of the present disclosure may be a Low Temperature Poly-Silicon (LTPS) transistor. When LTPS transistors are used in the array substrate, the corresponding subpixel aperture may be small, so the corresponding color resist is of a smaller size; therefore, the array substrate according to this embodiment of the present disclosure can achieve the integrity of the size of the color resist of an LTPS display panel. It should be noted that amorphous silicon (a-Si) transistors or other types of transistors may also be used in the array substrate according to this embodiment of the present disclosure.

In addition, in this embodiment of the present disclosure, a maximum width of the color resist C in the first direction X is d, and 10 μm≤d≤30 μm. In one implementation, the maximum width d of the color resist C in the first direction X is about 20 μm. In this embodiment of the present disclosure, the width of the color resist C within this range can achieve a high pixel density. In addition, the design of the color resist C according to this embodiment of the present disclosure still can achieve a high manufacturing yield when the width of the color resist C is small.

Referring to FIG. 1 and FIG. 3, in one embodiment of the present disclosure, subpixels in a same column may be in a same color, and the color resists C in a same column may also be in a same color. That is, each of the color resists C in a same column may be a first-color color resist C1 or a second-color color resist C2 or a third-color color resist C3. Therefore, in one implementation of this embodiment of the present disclosure, as shown in FIG. 3, the color resists C in a same column along a third direction Z may be formed into a continuous structure. It is to be noted that, although the color resists C in a same column are formed into a continuous structure, the color resists C in this column still include color sub-resists in one-to-one correspondence to the subpixels. Therefore, in one embodiment of the present disclosure, the color resist C includes color sub-resists in one-to-one correspondence to the pixel electrodes 21 and arranged along the third direction Z, and connecting portions located between adjacent color sub-resists and connecting adjacent color sub-resists. The third direction Z intersects with the first direction X. Moreover, the first recess H0 and the second recess H1 are formed at the connecting portion of the corresponding color resist C.

Taking the third-color color resist C3 shown in FIG. 3 as an example, the third-color color resist C3 includes color sub-resists C3a arranged along the third direction Z, and connecting portions C3b located between adjacent color sub-resists C3a and connecting adjacent color sub-resists C3a. The first recess H0 and the second recess H1 of the third color resist C3 are formed in a region where the connecting portion C3b is formed.

It is to be noted that, when the color resists C in a same column are in a same color and are formed into a continuous structure, the color resists in this column may be regarded as one color resist C. Understandably, the first edge of such a color resist C shall include a plurality of first recesses H0 and a plurality of second recesses H1, so that each color sub-resist corresponding to the pixel electrode 21 has a via portion H corresponding thereto.

When the color resists C in a same column are in a same color, the color resists in this column being formed into a continuous structure can avoid process failure in a patterning process. In addition, a continuous structure of the color resists C is also beneficial to forming a flat surface of another layer that is formed after the color resist layer C0. In addition, the first recess H0 and the second recess H1 being formed at the location of the connection portion can avoid an influence of the via portion H on an aperture rate of the subpixel.

Figure 7:
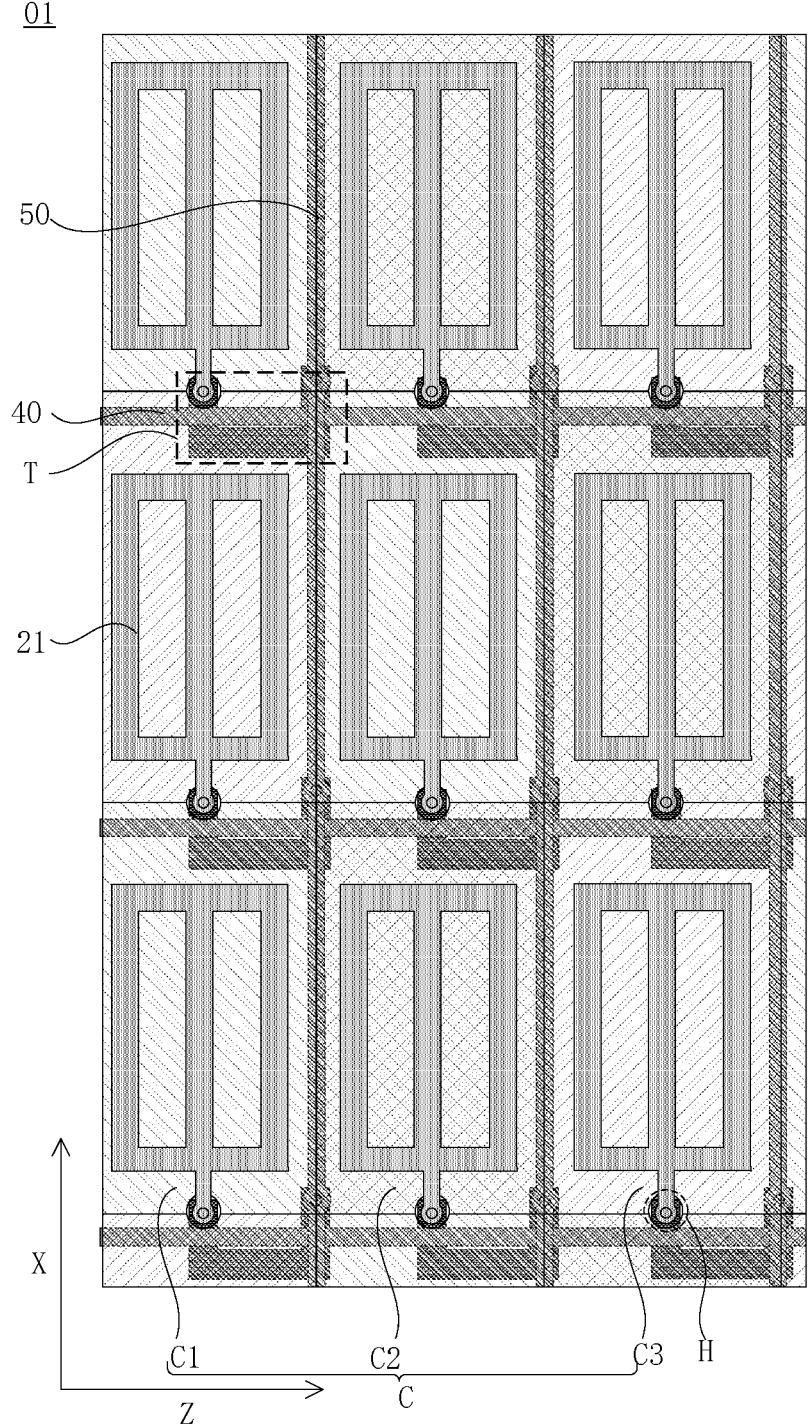
FIG. 7 is a schematic diagram of another array substrate according to an embodiment of the present disclosure.
Figure 8:
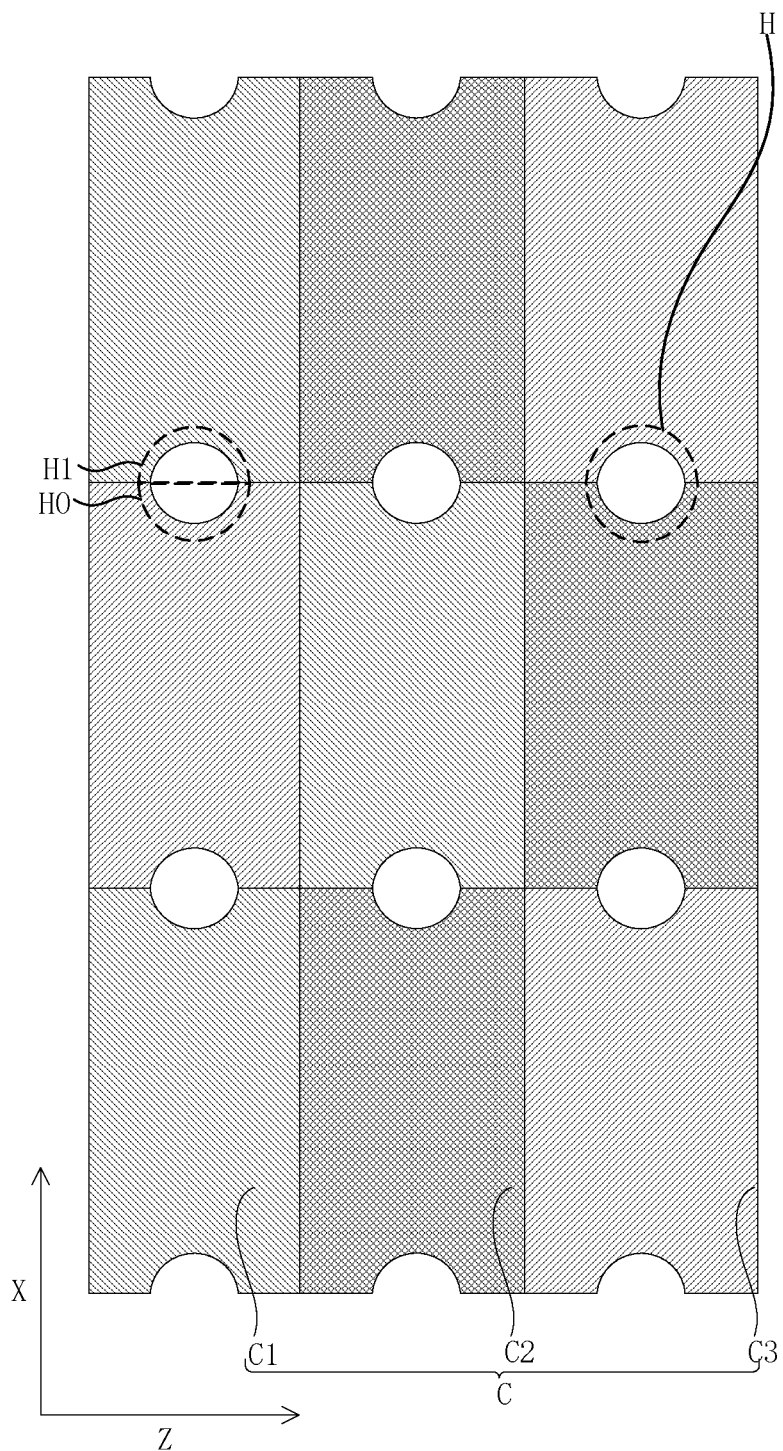
FIG. 8 is a schematic diagram of another color resist array layer according to an embodiment of the present disclosure.

FIG. 7 is a schematic diagram of another array substrate according to an embodiment of the present disclosure, and FIG. 8 is a schematic diagram of another color resist array layer according to an embodiment of the present disclosure.

As shown in FIG. 7 and FIG. 8, a plurality of color resists C arranged on the array substrate are arranged in an array. For example, the plurality of color resists C are arranged in multiple columns and rows in the first direction X and the third direction Z, and except for an edge region, any color resist C is arranged adjacent to at least four color resists C. That is, as shown in FIG. 7, the color resists C in this embodiment are in one-to-one correspondence to the pixel electrodes 21 and independent from one another. Along the first direction X, except for an edge region, each of two sides of each color resist C is provided with a respective color resist C. Along the third direction Z, except for an edge region, each of two sides of each color resist C is provided with a respective color resist C. Such a design can meet diverse requirements for subpixel arrangement.

Still referring to FIG. 7 and FIG. 8, along the first direction X, a color of each color resist C is different from a color of any color resist C adjacent thereto; and along the third direction Z, a color of each color resist C is different from a color of any color resist C adjacent thereto. Taking the second color resist C in the second row shown in FIG. 7 and FIG. 8 as an example, two color resists C located adjacently at upper and lower sides of the first-color color resist C1 are second-color color resists C2, and two color resists C located adjacently at left and right sides of the first-color color resist C1 are respectively a third-color color resist C3 and a second-color color resist C2. It is to be noted that, the color resists C in the present disclosure are arranged in an array, and a color of each color resist C is different from a color of any color resist C adjacent thereto in the row direction and in the column direction, and it may also be another situation different from the situation shown in FIG. 7 and FIG. 8. This design can achieve rendering technology, thereby further improving the pixel density. In addition, since the color resists C in different colors are formed one by one during the process for forming the color resists, when forming the color resists C in a same color and the first recess H0 and the second recess H1, neither side of upper, lower, left and right sides of the color resists C in this color needs to form a color resist C or form a first recess H0 and a second recess H1, thereby preventing a too small distance from being formed between a second region B2 corresponding to a subpixel in the corresponding mask plate P and a third region A1 corresponding to a subpixel adjacent thereto, which may otherwise lead to an abnormally-shaped color resist caused by light diffraction during the exposure.

In this embodiment, as shown in FIG. 7 and FIG. 8, the color resist C includes a first edge and a second edge in the first direction X, and a third edge and a fourth edge in the third direction Z. A length of each of the third edge and the fourth edge is greater than a length of each of the first edge and the second edge, and the third direction Z intersects with the first direction X. In this embodiment of the present disclosure, a first recess H0 and a second recess H1 are formed at the first edge and at the second edge, in other words, each of the first recess H0 and the second recess H1 of the color resist C is formed at a short side of the color resist C. That is, the first recess H0 and the second recess H1 are arranged along a length direction of the color resist C. In this way, for each color resist C, a distance between the first recess H0 and the second recess H1 is relatively large, which can more effectively avoid an abnormal-shaped color resist C caused by light diffraction in the exposure process by using the mask plate.

Figure 9:
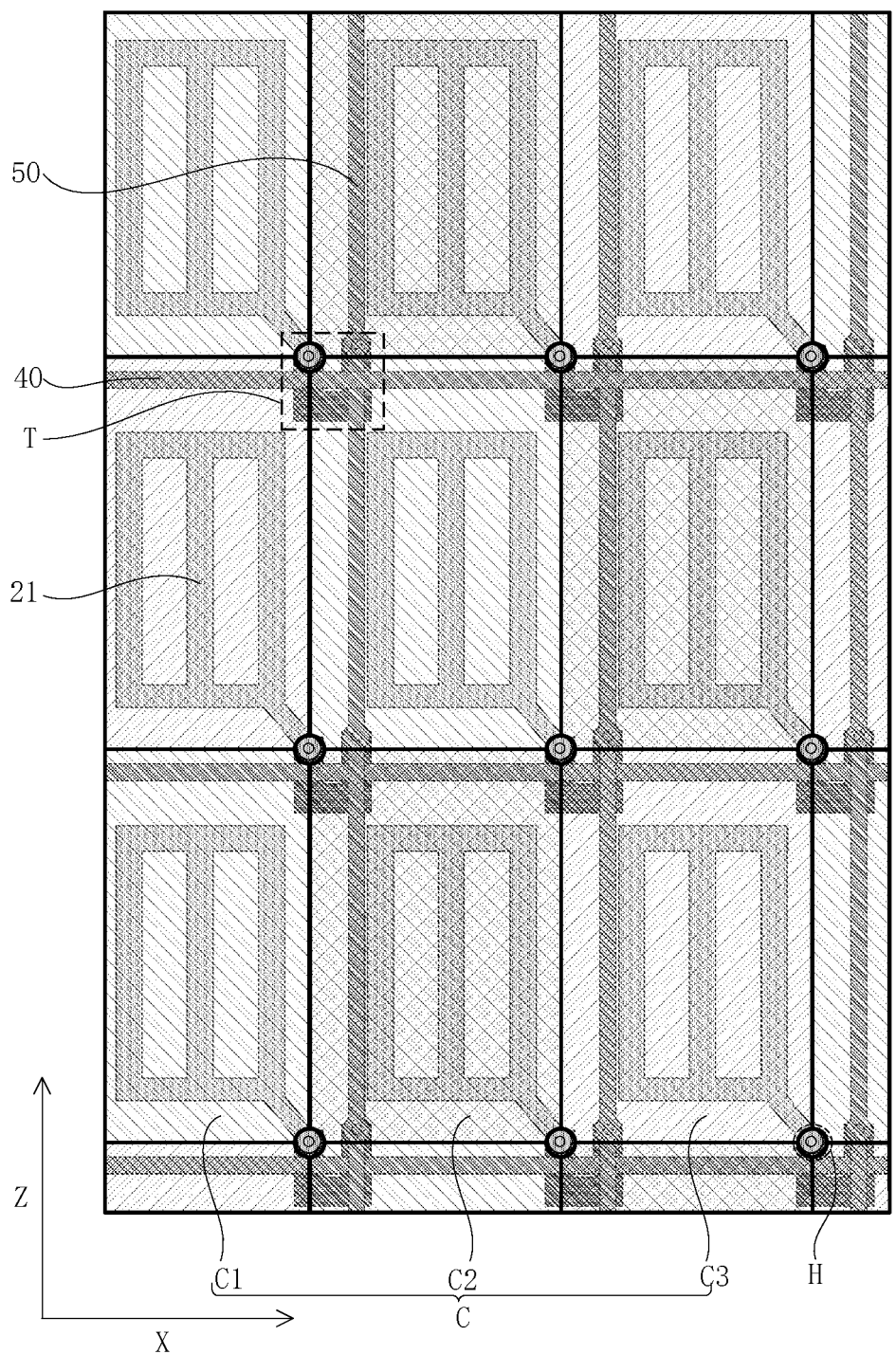
FIG. 9 is a schematic diagram of yet another array substrate according to an embodiment of the present disclosure.
Figure 10:
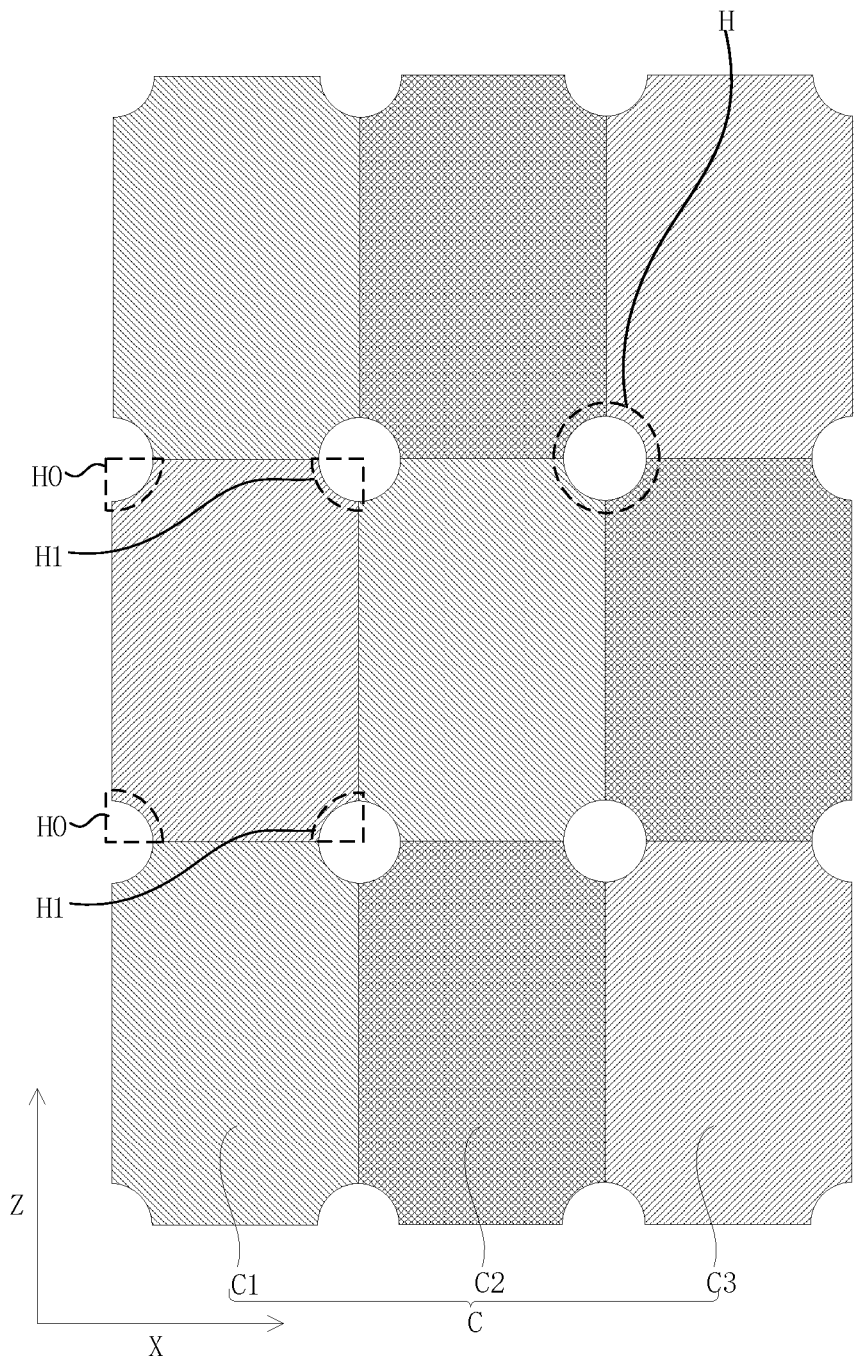
FIG. 10 is a schematic diagram of yet another color resist array layer according to an embodiment of the present disclosure.

FIG. 9 is a schematic diagram of yet another array substrate according to an embodiment of the present disclosure, and FIG. 10 is a schematic diagram of yet another color resist array layer according to an embodiment of the present disclosure.

As shown in FIG. 9 and FIG. 10, for the first edge and the second edge that are opposite to each other in the first direction X, two first recesses H0 are formed at the first edge, and the two first recesses H0 are arranged in the third direction Z and are formed at two ends of the first edge; and two second recesses H1 are formed at the second edge, and the two second recesses H1 are arranged in the third direction Z and are formed at two ends of the second edge. Taking the third-color color resist C3 located at the leftmost end of the second row in FIG. 10 as an example, when a left edge of the third-color color resist C3 is the first edge and a right side of the third-color color resist C3 is the second edge, then two first recesses H0 are formed at the first edge, and the two first recesses H0 are arranged in the third direction Z and are respectively formed at an upper end and a lower end of the third-color color resist C3 in the third direction Z. Similarly, two second recesses H1 are formed at the second edge, and the two second recesses H1 are arranged in the third direction Z and are respectively formed at an upper end and a lower end of the third-color color resist C3 in the third direction Z.

Referring to FIG. 9 and FIG. 10, in this embodiment of the present disclosure, the via portion H through which the pixel electrode 21 is electrically connected to the transistor T may be constituted by the first recesses H0 or the second recesses H1 of four color resists C. For example, in this embodiment, the via portion H is constituted by two first recesses H0 arranged adjacently in the third direction Z and two second recesses H1 arranged adjacently in the third direction Z, and the two first recesses H0 belong to different color resists C and the two second recesses H1 belong to different color resists C. That is, in a case where a size of the via portion H is determined, the two first recesses H0 constituting the via portion H are formed in two color resists C, and the two second recesses H1 constituting the via portion H are formed in two color resists C.

When the via portion H corresponding to one subpixel is constituted by the first recesses H0 or the second recesses H1 of a large number of color resists C, the first recess H0 and the second recess H1 of each color resist C are smaller, more numerous and more dispersed, therefore, a distance between second regions B2 on the corresponding mask plate is larger, which further avoids an abnormally-shaped color resist C caused by light diffraction.

The first recess H0 and the second recess H1 of the color resist C according to this embodiment of the present disclosure are in a same shape. As shown in FIG. 3 and FIG. 8, each of the first recess H0 and the second recess H1 according to this embodiment of the present disclosure may be in a shape of a semicircle. As shown in FIG. 10, each of the first recess H0 and the second recess H1 according to this embodiment of the present disclosure may be in a shape of a fan.

Figure 11:
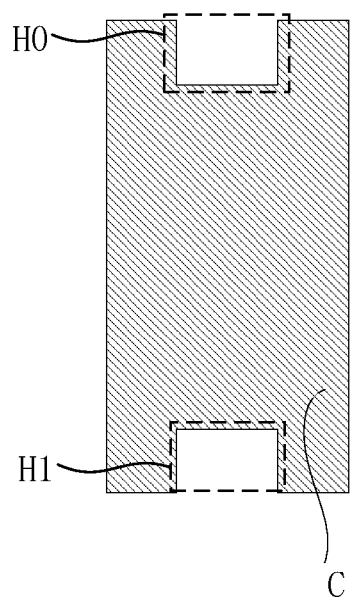
FIG. 11 is a schematic diagram of a color resist according to an embodiment of the present disclosure.
Figure 12:
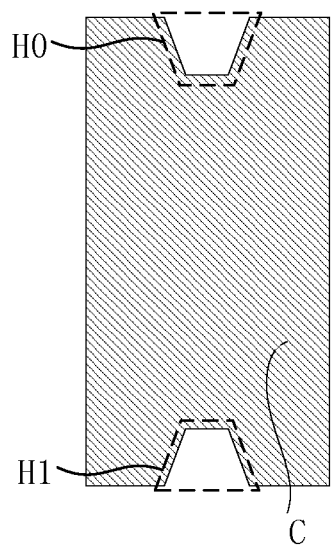
FIG. 12 is a schematic diagram of another color resist according to an embodiment of the present disclosure.
Figure 13:
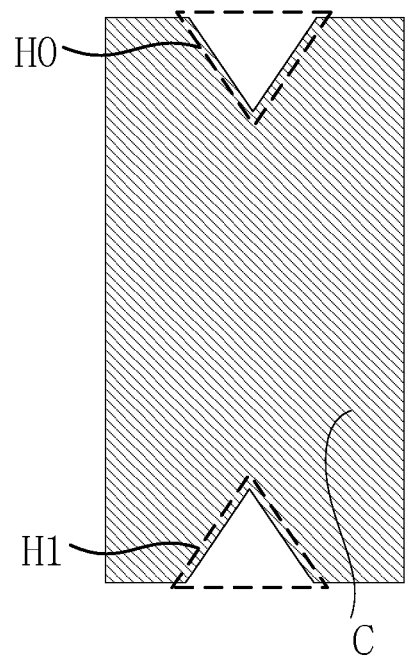
FIG. 13 is a schematic diagram of yet another color resist according to an embodiment of the present disclosure.

FIG. 11 is a schematic diagram of a color resist according to an embodiment of the present disclosure, FIG. 12 is a schematic diagram of another color resist according to an embodiment of the present disclosure, and FIG. 13 is a schematic diagram of yet another color resist according to an embodiment of the present disclosure. As shown in FIG. 11, each of the first recess H0 and the second recess H1 according to this embodiment of the present disclosure may be in a shape of a rectangle. As shown in FIG. 12, each of the first recess H0 and the second recess H1 according to this embodiment of the present disclosure may be in a shape of a trapezoid. As shown in FIG. 13, each of the first recess H0 and the second recess H1 according to this embodiment of the present disclosure may be in a shape of a triangle.

As described above, the first recess H0 and the second recess H1 according to this embodiment of the present disclosure are in a same shape, which may be any one of a semicircle, a fan, a triangle, a trapezoid and a rectangle. In addition, each of the first recess H0 and the second recess H1 may also be in another shape.

Figure 14:
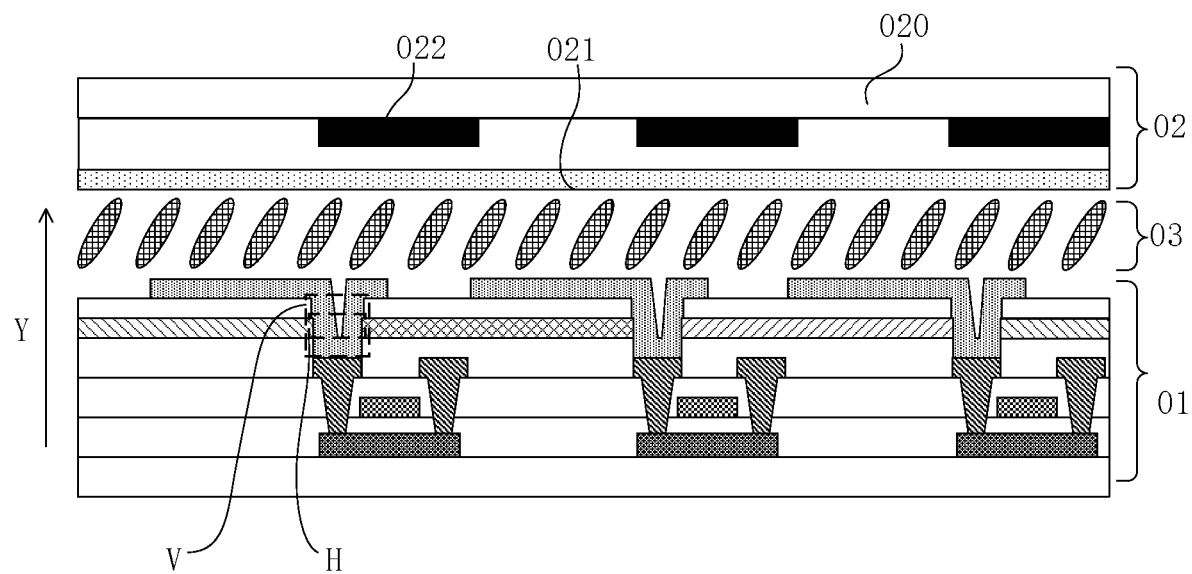
FIG. 14 is a schematic diagram of a display panel according to an embodiment of the present disclosure.
Figure 15:
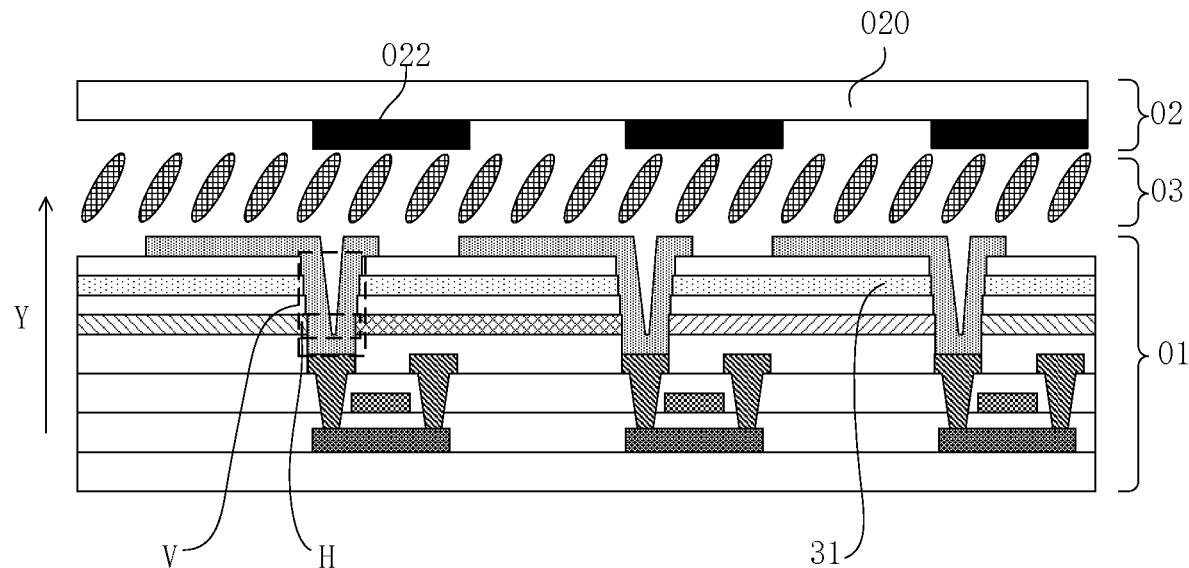
FIG. 15 is a schematic diagram of another display panel according to an embodiment of the present disclosure.

FIG. 14 is a schematic diagram of a display panel according to another embodiment of the present disclosure, and FIG. 15 is a schematic diagram of another display panel according to an embodiment of the present disclosure. As shown in FIG. 14 and FIG. 15, the display panel according to this embodiment of the present disclosure includes the array substrate 01 according to any one of the above embodiments.

As shown in FIG. 14 and FIG. 15, the display panel according to this embodiment of the present disclosure further includes an opposing substrate 02 and a liquid crystal layer 03. For example, the array substrate 01 is arranged opposite to the opposing substrate 02, and the liquid crystal layer 03 is arranged between the array substrate 01 and the opposing substrate 02.

In this embodiment, the opposing substrate 02 includes a second base 020, and each of the first base 10 and the second base 020 may be a curved base or a flexible base.

In this embodiment of the present disclosure, the color layer is formed on the array substrate of the display panel, which can avoid problems of light leakage and color display chaos caused by deviation between the color resist and the corresponding subpixel in the process of bending the display panel. In addition, the design of the color resist in the display panel according to this embodiment of the present disclosure can be applied to the design of high pixel density and can achieve an expected manufacturing yield of the color resists, thereby improving a display effect and a manufacturing yield of the display panel.

In one embodiment of the present disclosure, referring to FIG. 14 and FIG. 15, the opposing substrate 02 further includes a black matrix 022, and a projection of the black matrix 022 in the second direction Y covers projections of the first recess and the second recess in the second direction Y That is, in the second direction Y, the black matrix 022 covers the via portion H formed in the color resist layer. Moreover, in the second direction Y, the black matrix 022 covers the via V. This design can avoid that the via portion H is exposed in a display region to affect normal display.

In addition, still referring to FIG. 14, the opposing substrate 02 in this embodiment of the present disclosure may further include a common electrode 021, and correspondingly, the array substrate 01 is provided with no common electrode layer. In addition, as shown in FIG. 15, the opposing substrate 02 may be provided with no common electrode, and the common electrode 31 is provided on the array substrate 01.

Figure 16:
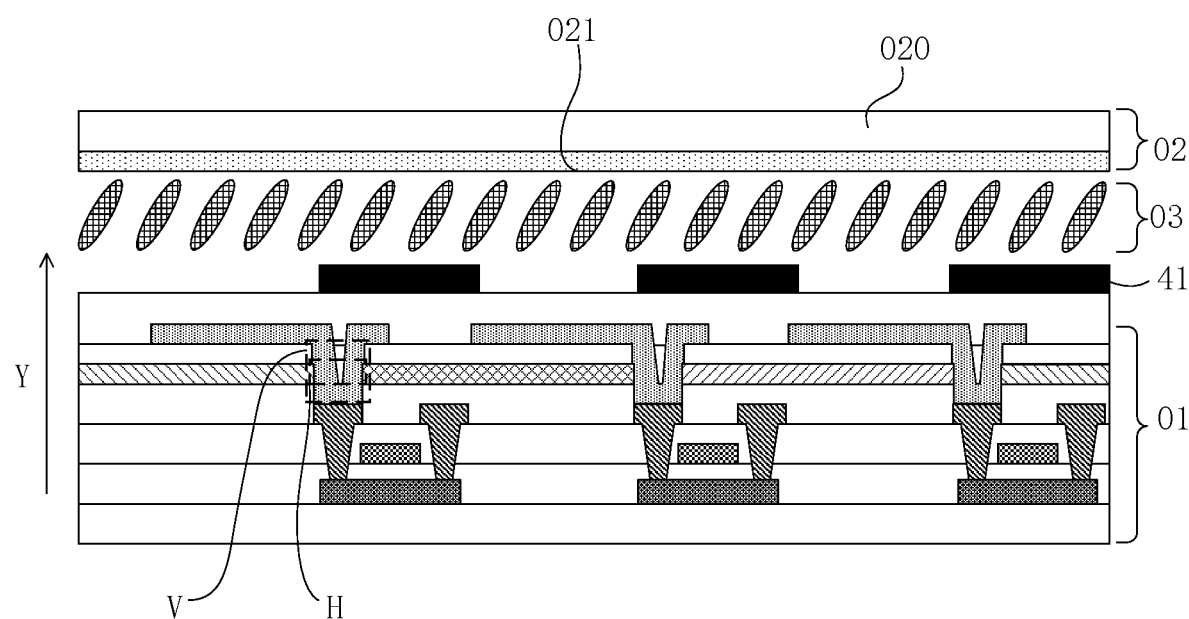
FIG. 16 is a schematic diagram of yet another display panel according to an embodiment of the present disclosure.

FIG. 16 is a schematic diagram of yet another display panel according to an embodiment of the present disclosure. The embodiment shown FIG. 16 is different from the embodiment shown in FIG. 14 in that the array substrate 01 further includes a black matrix 41, and a projection of the black matrix 41 in the second direction Y covers projections of the first recess and the second recess in the second direction Y. That is, in this embodiment, the black matrix 41 is provided on the array substrate 01, but not on the opposing substrate 02. The black matrix 41 and the color resist layer are both formed on the array substrate 01, so that deviation between the block matrix 41 and the via portion H can be avoided in the process of curving or bending the display panel, thereby achieving an expected visual effect.

Figure 17:
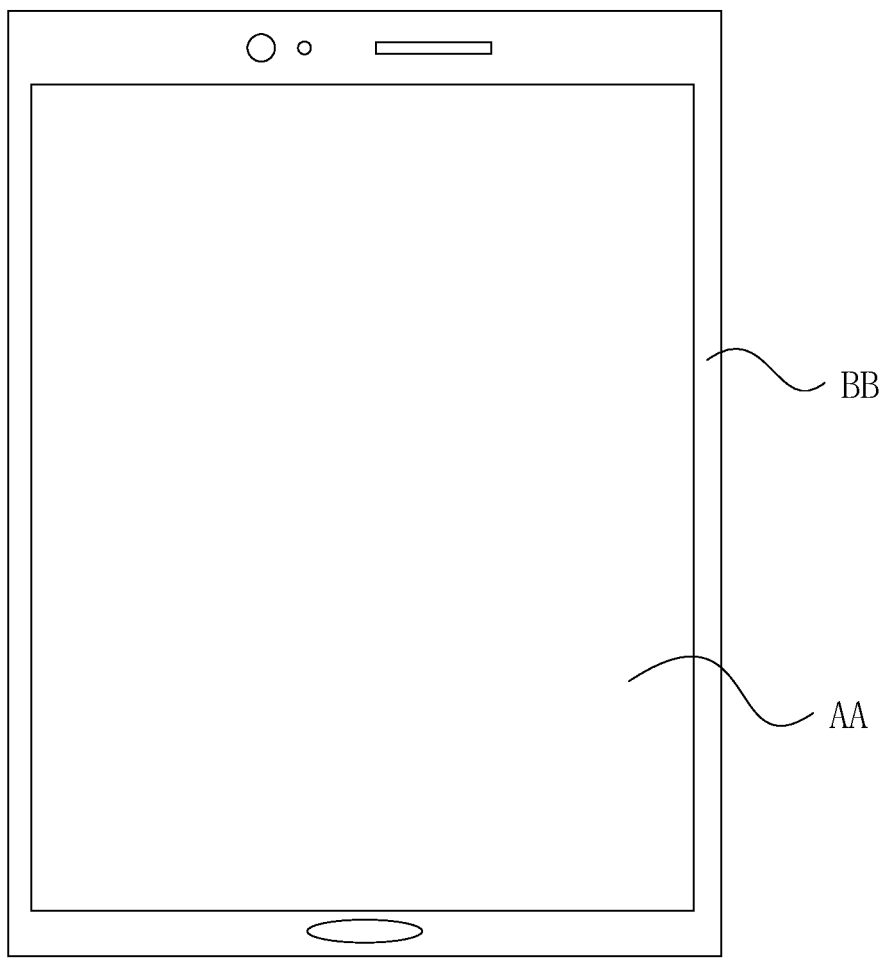
FIG. 17 is a schematic diagram of a display device according to an embodiment of the present disclosure.

FIG. 17 is a schematic diagram of a display device according to an embodiment of the present disclosure. The display device according to this embodiment of the present disclosure includes the display panel according to any one of the above embodiments. The display device according to this embodiment of the present disclosure may be a mobile phone. In addition, the display device according to this embodiment of the present disclosure may also be a computer, a television or other display devices. As shown in FIG. 17, the display device according to this embodiment of the present disclosure has a display region AA and a non-display region BB surrounding the display region AA. The array substrate corresponding to the display region AA is provided with a color resist layer and a pixel electrode layer.

In the display device according to this embodiment of the present disclosure, the color layer is formed on the array substrate of the display panel, which can avoid problems of light leakage and color display chaos caused by deviation between the color resist and the corresponding subpixels in the process of bending the display panel. In addition, the design of the color resist in the display device according to this embodiment of the present disclosure can be applied to the design of high pixel density and can achieve an expected manufacturing yield of the color resists, so as to improve a display effect and a manufacturing yield of the display device. Through the design of the color resist according to the embodiments of the present disclosure, a distance between light-shielding regions of a mask plate is increased during a process for forming the color resist, thereby avoiding diffraction of light in an exposure process, so as to obtain a designed shape of the color resist. At the same time, through the design of the color resist according to the embodiments of the present disclosure, during development, a photoresist to be removed is located at an edge of a cured photoresist, so as to fully contact a developing solution to be completely developed off. During etching, the color resist to be etched off is located at an edge of the color resist, so as to fully contact an etching solution to be completely etched off. Therefore, the design of the color resist according to the embodiments of the present disclosure can reduce difficulty in terms of forming a hole in the color resist, thereby improving the reliability of the connection between the pixel electrode and the transistor.

The above descriptions are merely preferred embodiments of the present disclosure, which are not intended to limit the present disclosure. Any modification, equivalent replacement, improvement, and the like made within the principle of the present disclosure shall fall into a protection scope of the present disclosure.

What is claimed is:

1. An array substrate, comprising:
    a first base;
    a switch array layer arranged on the first base and comprising a plurality of transistors;
    a pixel electrode layer comprising a plurality of pixel electrodes, each of which being electrically connected to a drain electrode of a respective one of the plurality of pixel electrodes through a respective via; and a color resist array layer comprising a plurality of color resists, each of which comprises a first edge and a second edge that are opposite to each other in a first direction, wherein at least one first recess is formed at the first edge, and at least one second recess is formed at the second edge; of two color resists of the plurality of color resists that are arranged adjacently in the first direction, the at least one first recess of one color resist is opposite to the at least one second recess of the other color resist; and projections of the at least one first recess and the at least one second recess that are opposite to each other overlap at least partially with a projection of the via in a second direction, and the second direction is parallel to a thickness direction of the array substrate, wherein the plurality of color resists are arranged in an array, wherein for one of the plurality of color resists, two first recesses are formed at the first edge, and two second recesses are formed at the second edge; and the two first recesses are arranged in a third direction and are respectively formed at two ends of the first edge, the two second recesses are arranged in the third direction and are respectively formed at two ends of the second edge, and the third direction intersects with the first direction.

2. The array substrate according to claim 1, wherein the color resist layer is located at a side of the pixel electrode layer adjacent to the switch array layer.

3. The array substrate according to claim 1, wherein each of the plurality of transistors is a low temperature polysilicon transistor.

4. The array substrate according to claim 1, wherein each of the plurality of color resists has a maximum width d in the first direction, where 10 µm≤d≤30 µm.

5. The array substrate according to claim 1, wherein a color of each of the plurality of color resists is different from a color of any color resist adjacent thereto.

6. The array substrate according to claim 1, wherein each of the plurality of color resists further comprises a third edge and a fourth edge in a third direction, a length of each of the third edge and the fourth edge is greater than a length of each of the first edge and the second edge, and the third direction intersects with the first direction.

7. The array substrate according to claim 1, wherein each of the at least one first recess and the at least one second recess have a same shape, which is one of a semicircle, a fan, a triangle, a trapezoid or a rectangle.

8. The array substrate according to claim 1, further comprising a common electrode layer, wherein the common electrode layer comprises a common electrode and is located at a side of the color resist array layer away from the switch array layer.

9. The array substrate according to claim 1, wherein the first base is a curved base or a flexible base.

10. A display panel, comprising:
an array substrate;
an opposing substrate opposite to the array substrate; and
a liquid crystal layer located between the opposing substrate and the array substrate,
wherein the array substrate comprises:
a first base;
a switch array layer arranged on the first base and comprising a plurality of transistors;

a pixel electrode layer comprising a plurality of pixel electrodes, each of which being electrically connected to a drain electrode of a respective one of the plurality of pixel electrodes through a respective via; and a color resist array layer comprising a plurality of color resists, each of which comprises a first edge and a second edge that are opposite to each other in a first direction, wherein at least one first recess is formed at the first edge, and at least one second recess is formed at the second edge; of two color resists of the plurality of color resists that are arranged adjacently in the first direction, the at least one first recess of one color resist is opposite to the at least one second recess of the other color resist; and projections of the at least one first recess and the at least one second recess that are opposite to each other overlap at least partially with a projection of the via in a second direction, and the second direction is parallel to a thickness direction of the array substrate, wherein the plurality of color resists are arranged in an array, wherein for one of the plurality of color resists, two first recesses are formed at the first edge, and two second recesses are formed at the second edge; and the two first recesses are arranged in a third direction and are respectively formed at two ends of the first edge, the two second recesses are arranged in the third direction and are respectively formed at two ends of the second edge, and the third direction intersects with the first direction.

11. The display panel according to claim 10, wherein the opposing substrate comprises a second base, which is a curved base and a flexible base.

12. The display panel according to claim 10, wherein the opposing substrate further comprises a black matrix, and a projection of the black matrix in the second direction covers projections of the at least one first recess and the at least one second recess in the second direction.

13. The display panel according to claim 10, wherein the array substrate further comprises a black matrix, and a projection of the black matrix in the second direction covers projections of the at least one first recess and the at least one second recess in the second direction.

14. A display device, comprising a display panel, wherein the display panel comprises: an array substrate; an opposing substrate opposite to the array substrate; and a liquid crystal layer located between the opposing substrate and the array substrate,
wherein the array substrate comprises:
a first base;
a switch array layer arranged on the first base and comprising a plurality of transistors;
a pixel electrode layer comprising a plurality of pixel electrodes, each of which being electrically connected to a drain electrode of a respective one of the plurality of pixel electrodes through a respective via; and
a color resist array layer comprising a plurality of color resists, each of which comprises a first edge and a second edge that are opposite to each other in a first direction,
wherein at least one first recess is formed at the first edge, and at least one second recess is formed at the second edge; of two color resists of the plurality of color resists that are arranged adjacently in the first direction, the at least one first recess of one color resist is opposite to the at least one second recess of the other color resist; and projections of the at least one first recess and the at least one second recess that are opposite to each other overlap at least partially with a projection of the via in a second direction, and the second direction is parallel to a thickness direction of the array substrate, wherein the plurality of color resists are arranged in an array, wherein for one of the plurality of color resists, two first recesses are formed at the first edge, and two second recesses are formed at the second edge; and the two first recesses are arranged in a third direction and are respectively formed at two ends of the first edge, the two second recesses are arranged in the third direction and are respectively formed at two ends of the second edge, and the third direction intersects with the first direction.

* * * * *